US012515455B2

(12) United States Patent
Ikeuchi et al.

(10) Patent No.: US 12,515,455 B2
(45) Date of Patent: Jan. 6, 2026

(54) CONTROLLED LIQUID DISCHARGE

(71) Applicant: KYOCERA CORPORATION, Kyoto (JP)

(72) Inventors: Wataru Ikeuchi, Kirishima (JP); Daisuke Hozumi, Kirishima (JP); Shohei Koide, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 222 days.

(21) Appl. No.: 18/547,696

(22) PCT Filed: Feb. 22, 2022

(86) PCT No.: PCT/JP2022/007385
§ 371 (c)(1),
(2) Date: Aug. 24, 2023

(87) PCT Pub. No.: WO2022/181637
PCT Pub. Date: Sep. 1, 2022

(65) Prior Publication Data

US 2024/0051302 A1 Feb. 15, 2024

(30) Foreign Application Priority Data

Feb. 25, 2021 (JP) ................................ 2021-028889

(51) Int. Cl.

| | |
|---|---|
| ***B41J 2/165*** | (2006.01) |
| ***B41J 2/18*** | (2006.01) |
| ***B41J 3/407*** | (2006.01) |
| ***B41J 19/14*** | (2006.01) |

(Continued)

(52) U.S. Cl.
CPC ............ *B41J 2/16535* (2013.01); *B41J 2/18* (2013.01); *B41J 3/4073* (2013.01); *B41J 19/142* (2013.01); *B41J 25/006* (2013.01); *B41J 2002/14459* (2013.01); *B41J 2202/12* (2013.01)

(58) Field of Classification Search
CPC .... B41J 2/16535; B41J 25/006; B41J 3/4073; B41J 19/142; B41J 2002/14459; B41J 2202/12; B41J 2/18
See application file for complete search history.

(56) References Cited

U.S. PATENT DOCUMENTS

2015/0009254 A1* 1/2015 Kaiba .................. B41J 3/4073 901/43
2017/0066246 A1 3/2017 Miyazawa
(Continued)

FOREIGN PATENT DOCUMENTS

JP 2016159514 A 9/2016
JP 2020001319 A 1/2020
(Continued)

*Primary Examiner* — Henok D Legesse
(74) *Attorney, Agent, or Firm* — HAUPTMAN HAM, LLP

(57) ABSTRACT

A recording device includes a liquid discharger rotatable around a predetermined rotation axis and configured to discharge liquid while circulating the liquid internally and a controller configured to control the liquid discharger to discharge a liquid droplet while reciprocating along a printing direction. The controller controls a position and a posture of the liquid discharger, and thus printing is started from a positive pressure side of the liquid circulating inside the liquid discharger.

12 Claims, 12 Drawing Sheets

(51) Int. Cl.
*B41J 25/00* (2006.01)
*B41J 2/14* (2006.01)

(56) References Cited

U.S. PATENT DOCUMENTS

2021/0031552 A1 2/2021 Okuda et al.
2021/0402686 A1 * 12/2021 Kumagai ............... B41J 3/4073

FOREIGN PATENT DOCUMENTS

WO 2020171705 A1 8/2020
WO WO-2020171714 A1 * 8/2020

* cited by examiner

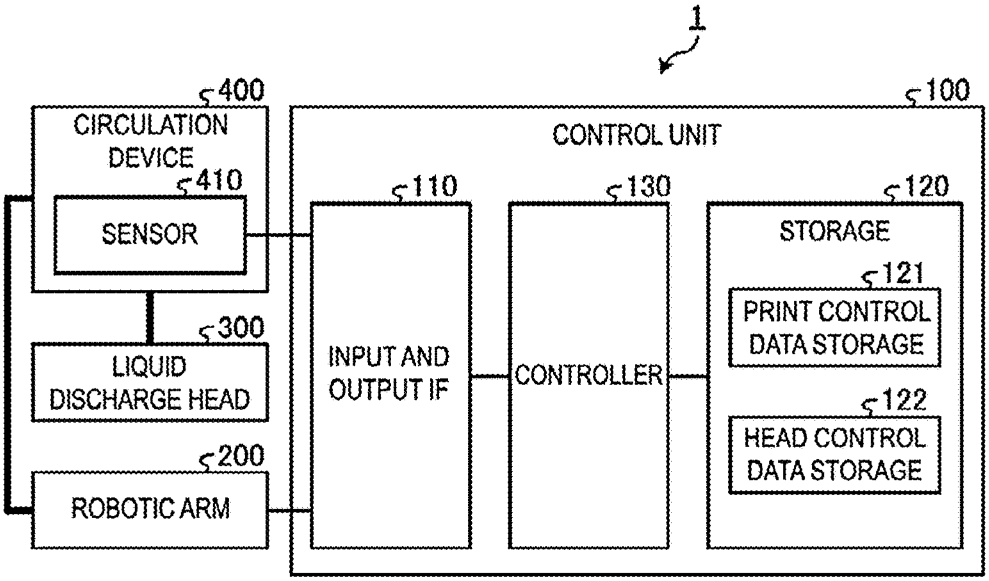

FIG.7

| MOVEMENT POSTURE OF HEAD | ORIENTATION OF HEAD | |
|---|---|---|
| | OUTWARD PATH | HOMEWARD PATH |
| SUBSTANTIALLY HORIZONTAL | WITH RESPECT TO PRINTING DIRECTION SUPPLY PORT: RIGHT, DISCHARGE PORT: LEFT | WITH RESPECT TO PRINTING DIRECTION SUPPLY PORT: RIGHT, DISCHARGE PORT: LEFT |
| SUBSTANTIALLY VERTICAL | WITH RESPECT TO PRINTING DIRECTION SUPPLY PORT: LOWER, DISCHARGE PORT: UPPER | WITH RESPECT TO PRINTING DIRECTION SUPPLY PORT: UPPER, DISCHARGE PORT: LOWER |

FIG.8

CONTROLLED LIQUID DISCHARGE

CROSS-REFERENCE TO RELATED APPLICATIONS

This application is national stage application of International Application No. PCT/JP2022/007385, filed on Feb. 22, 2022, which designates the United States, and which claims the benefit of priority from Japanese Patent Application No. 2021-028889, filed on Feb. 25, 2021.

TECHNICAL FIELD

An embodiment of the disclosure relates to a recording device.

BACKGROUND OF INVENTION

A known recording device includes an inkjet printer or an inkjet plotter that utilizes an inkjet recording method of recording an image and the like by discharging liquid or a liquid droplet from a head. Regarding the above-described inkjet recording device utilizing an inkjet method, a technology to have stable discharge performance has been proposed.

CITATION LIST

Patent Literature

Patent Document 1: JP 2016-159514 A

SUMMARY

Solution to Problem

In an aspect of an embodiment, a recording device includes a liquid discharger rotatable around a predetermined rotation axis and configured to discharge liquid while circulating the liquid internally and a controller configured to control the liquid discharger to discharge a liquid droplet while reciprocating along a printing direction. The controller controls a position and a posture of the liquid discharger, and thus printing is started from a positive pressure side of the liquid circulating inside the liquid discharger.

BRIEF DESCRIPTION OF THE DRAWINGS

FIG. 7 is a block diagram illustrating an example of a functional configuration of each unit provided in a liquid discharge system according to an embodiment.

FIG. 8 is a chart illustrating an outline of head control data according to an embodiment.

DESCRIPTION OF EMBODIMENTS

An embodiment of a recording device disclosed by the present application will be described in detail below with reference to the accompanying drawings. The invention according to the present application is not limited by embodiments described below.

The following embodiment describes, as an example of the recording device disclosed by the present application, a liquid discharge system in which a liquid discharge head that discharges liquid (or a liquid droplet) by using an inkjet method is mounted on a robotic arm. The recording device disclosed by the present application can be applied to inkjet printers and inkjet plotters that utilize an inkjet recording method as well as various devices that discharge liquid (or liquid droplet) by using an inkjet method.

Outline of Liquid Discharge System

Figure 1:
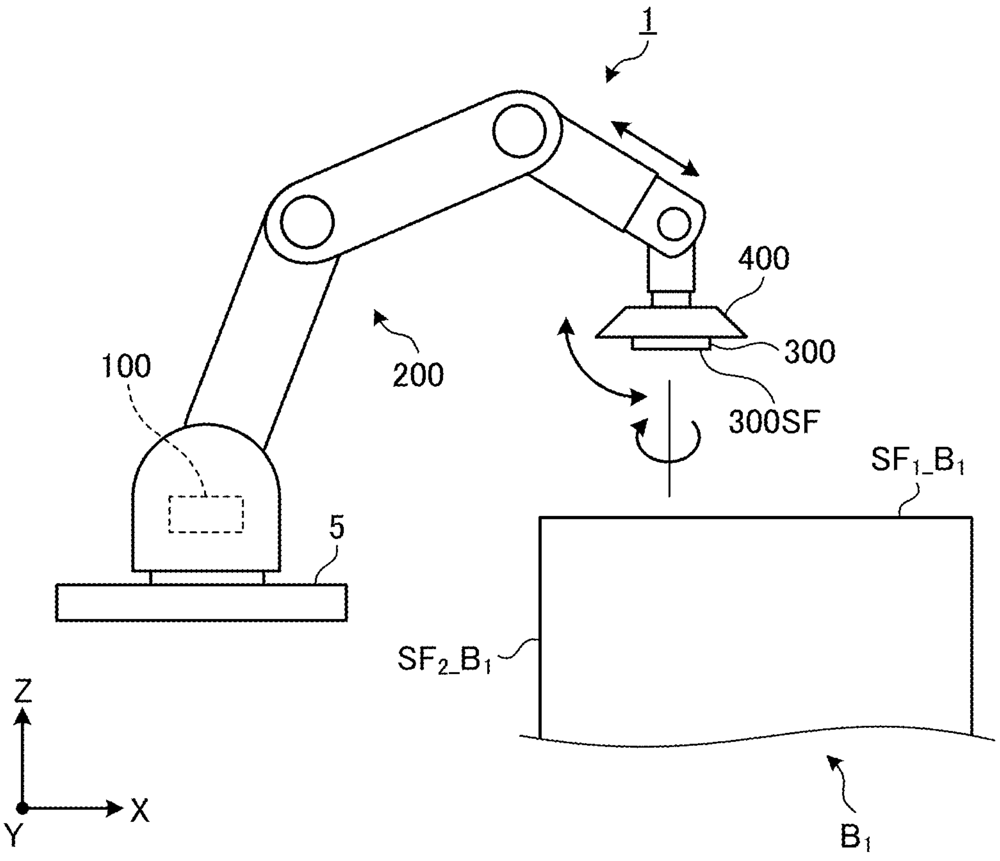
FIG. 1 is a schematic diagram illustrating an outline of a liquid discharge system according to an embodiment.
Figure 2:
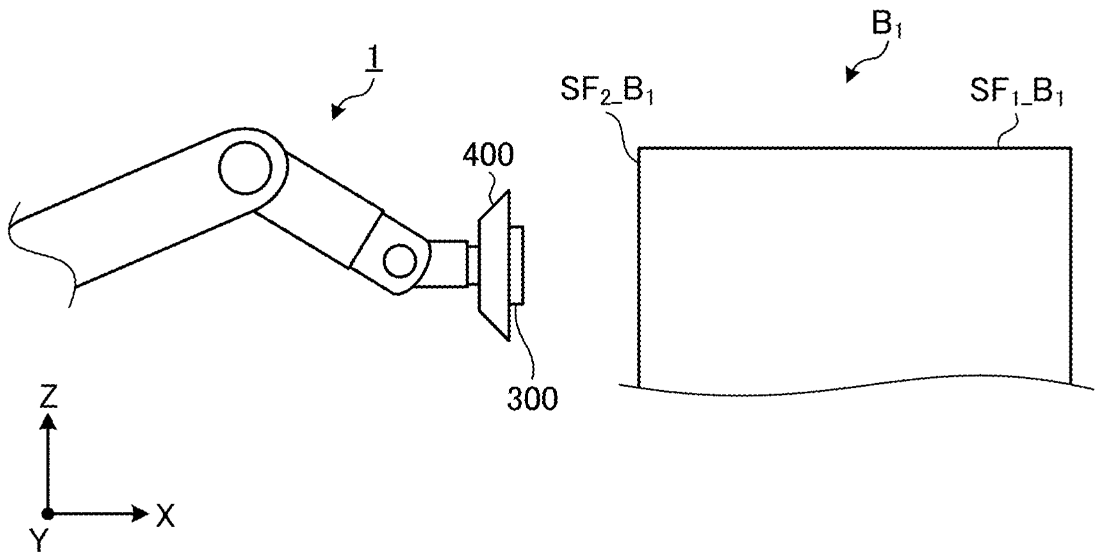
FIG. 2 is a schematic diagram illustrating an outline of the liquid discharge system according to an embodiment.

An outline of a liquid discharge system according to an embodiment will be described using FIGS. 1 and 2. FIGS. 1 and 2 are schematic views illustrating an outline of the liquid discharge system according to an embodiment.

As illustrated in FIG. 1 or 2, a liquid discharge system 1 includes a control unit 100, a robotic arm 200, a liquid discharge head 300, and a circulation device 400.

The control unit 100 is built in, for example, the robotic arm 200. The control unit 100 may be mounted on an external device independent from the robotic arm 200, and may be communicably connected to the robotic arm 200. The control unit 100 outputs a command for controlling an operation of the robotic arm 200 to the robotic arm 200. This causes the control unit 100 to control, via the robotic arm 200, a position and a posture of the liquid discharge head 300 (and the circulation device 400) mounted to the most distal end portion of the robotic arm 200.

The control unit 100 can cause the robotic arm 200 to move the liquid discharge head 300 (and the circulation device 400). This allows the control unit 100 to change the position of the liquid discharge head 300 (and the circulation device 400). The control unit 100 can also cause the robotic arm 200 to rotate the liquid discharge head 300 (and the circulation device 400) around a predetermined rotation axis (for example, a Y axis or a Z axis). This allows the control unit 100 to change the posture such as an orientation and an angle of the liquid discharge head 300 (and the circulation device 400).

The robotic arm 200 operates to change the position, the posture, and the like of the liquid discharge head 300 in accordance with a command from the control unit 100. The robotic arm 200 is assembled on a base 5 mounted on, for example, a horizontal floor surface indoors or outdoors. The robotic arm 200 may be movable on the base 5. The robotic arm 200 is composed of a plurality of parts assembled extendably and rotatably. The robotic arm 200 has a degree of freedom that enables change of movement, posture, and the like necessary for the liquid discharge head 300 and is not limited to the particular configuration illustrated in FIGS. 1 and 2.

The liquid discharge head 300 is a so-called circulating inkjet head that discharges liquid while circulating the liquid inside the liquid discharge head. The liquid discharge head 300 functions as a liquid discharger that discharges liquid to a substantially horizontal working surface $SF_1\_B_1$ of an object $B_1$ to be printed (recorded) or a substantially vertical working surface $SF_2\_B_1$ of the object $B_1$. The liquid discharge head 300 is mounted to the most distal end portion of the robotic arm 200 together with the circulation device 400.

The circulation device 400 controls a circulation pressure of liquid circulating between the circulation device 400 and the liquid discharge head 300 to supply the liquid to the liquid discharge head 300. The circulation device 400 is mounted to the most distal end portion of the robotic arm 200 together with the liquid discharge head 300. The circulation device 400 changes its position and posture integrally with the liquid discharge head 300.

The circulation pressure of the liquid to be supplied to the liquid discharge head 300 is affected by a change in the position and the posture of the liquid discharge head 300 made by the robotic arm 200. When, in particular, a discharge amount of the liquid is large, the influence on the circulation pressure increases, and discharge omission may occur. In view of such problems, the present application proposes the liquid discharge system 1 capable of suppressing the occurrence of discharge omission and maintaining a quality of an image to be recorded.

Configuration Example of Liquid Discharge Head

Figure 3:
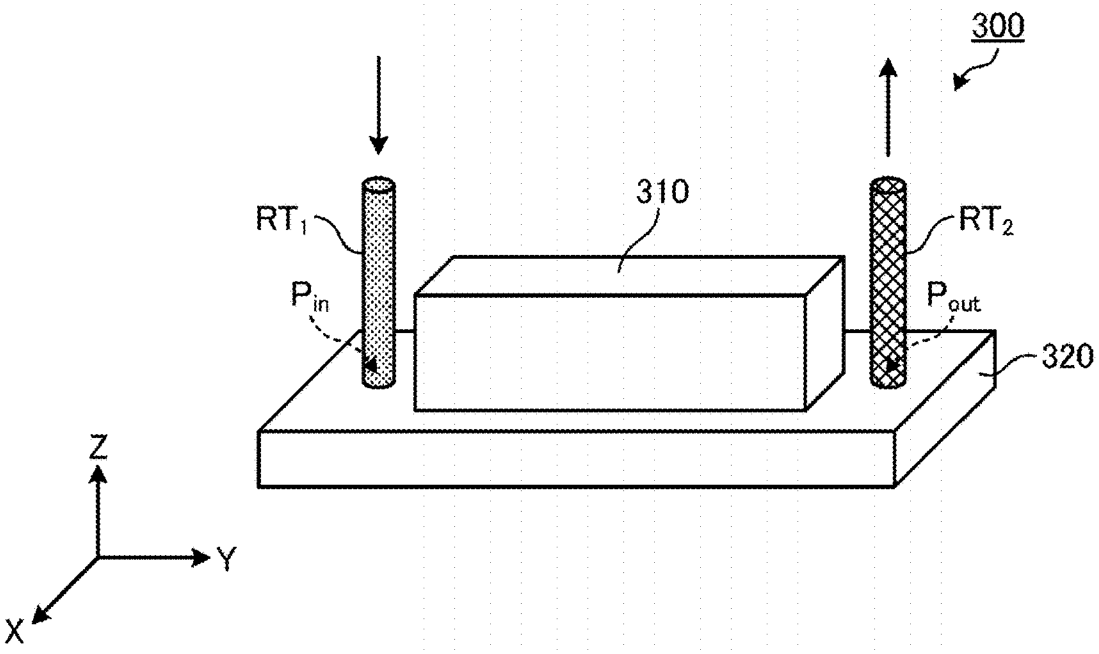
FIG. 3 is a perspective view schematically illustrating an outer appearance configuration of a liquid discharge head according to an embodiment.
Figure 4:
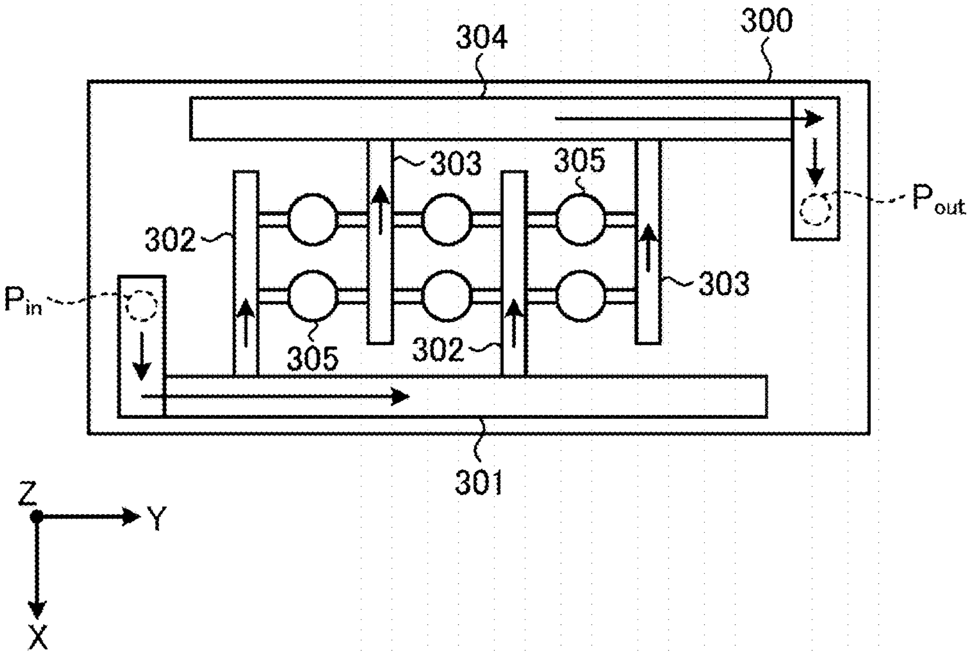
FIG. 4 is a plan view illustrating a liquid discharge head according to an embodiment.
Figure 5:
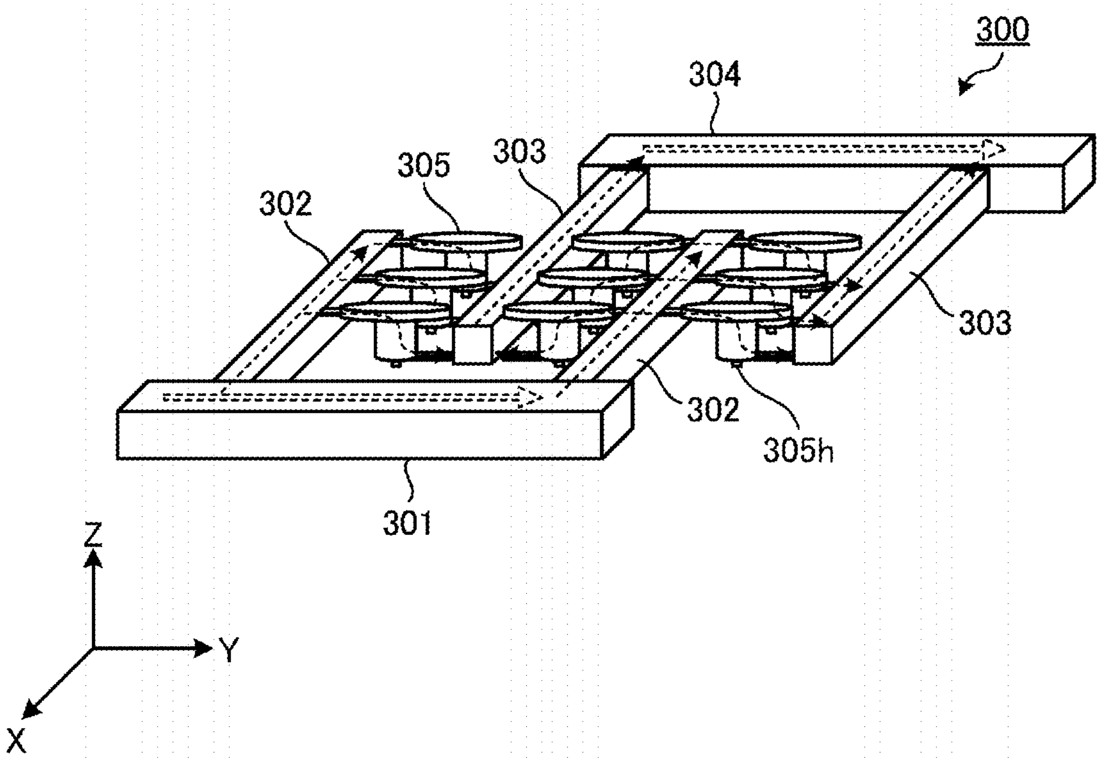
FIG. 5 is a diagram schematically illustrating a channel inside a liquid discharge head according to an embodiment.

The liquid discharge head 300 according to an embodiment will be described with FIGS. 3 to 5. FIG. 3 is a perspective view schematically illustrating an outer appearance configuration of a liquid discharge head according to an embodiment. FIG. 4 is a plan view of the liquid discharge head according to an embodiment. FIG. 5 is a diagram schematically illustrating a channel inside the liquid discharge head according to an embodiment.

As illustrated in FIG. 3, the liquid discharge head 300 includes a housing including a member 310 having a box shape and a member 320 having a flat plate shape. The housing of the liquid discharge head 300 includes a first channel $RT_1$ for supplying liquid from the circulation device 400 to the inside of the head and a second channel $RT_2$ for delivering liquid recovered inside the head back to the circulation device 400. As illustrated in FIG. 4 or 5, the member 320 of the liquid discharge head 300 has a supply port $P_{in}$ through which liquid is supplied to the inside of the head through the first channel $RT_1$ and a discharge port $P_{out}$ through which liquid is discharged from the inside of the head through the second channel $RT_2$.

As illustrated in FIG. 3, the liquid discharge head 300 includes a supply reservoir 301, a supply manifold 302, a recovery manifold 303, a recovery reservoir 304, and an element 305.

The supply reservoir 301 has an elongated shape extending in a longitudinal direction (Y-axis direction) of the liquid discharge head 300 and is connected to the supply manifold 302. The supply reservoir 301 has a channel therein. As illustrated in FIG. 4 or 5, the liquid supplied to the supply reservoir 301 through the first channel $RT_1$ and the supply port $P_{in}$ and stored in the channel of the supply reservoir 301 is delivered to the supply manifold 302.

The supply manifold 302 has an elongated shape extending in a lateral direction (X-axis direction) of the liquid discharge head 300 to near the recovery reservoir 304. The supply manifold 302 internally has a channel that communicates with the channel included in the supply reservoir 301 and with the element 305. As illustrated in FIG. 4 or 5, the liquid delivered from the supply reservoir 301 to the supply manifold 302 is delivered from the supply manifold 302 to the element 305.

The recovery manifold 303 has an elongated shape extending in the lateral direction (X-axis direction) of the liquid discharge head 300 to near the supply reservoir 301. The recovery manifold 303 internally has a channel that communicates with the channel included in the recovery reservoir 304 and with the element 305. As illustrated in FIG. 4 or 5, liquid is not discharged from the element 305 (discharge hole 305*h*) to the outside is delivered to the recovery manifold 303.

The recovery reservoir 304 has an elongated shape extending in the longitudinal direction (Y-axis direction) of the liquid discharge head 300 and is connected to the recovery manifold 303. The recovery reservoir 304 has a channel therein. As illustrated in FIG. 4 or 5, the liquid delivered from the recovery manifold 303 to the recovery reservoir 304 and stored in the channel of the recovery reservoir 304 is delivered back to the circulation device 400 through the discharge port $P_{out}$ and the second channel $RT_2$.

The element 305 has a discharge hole 305*h*. The element 305, for example, suctions liquid from the supply manifold 302 by using negative pressure generated in a pressure chamber (not illustrated) and discharges the suctioned liquid from the discharge hole 305*h* toward the object $B_1$ by using positive pressure generated in the pressure chamber (not illustrated).

Hardware Configuration Example of Liquid Discharge System

Figure 6:
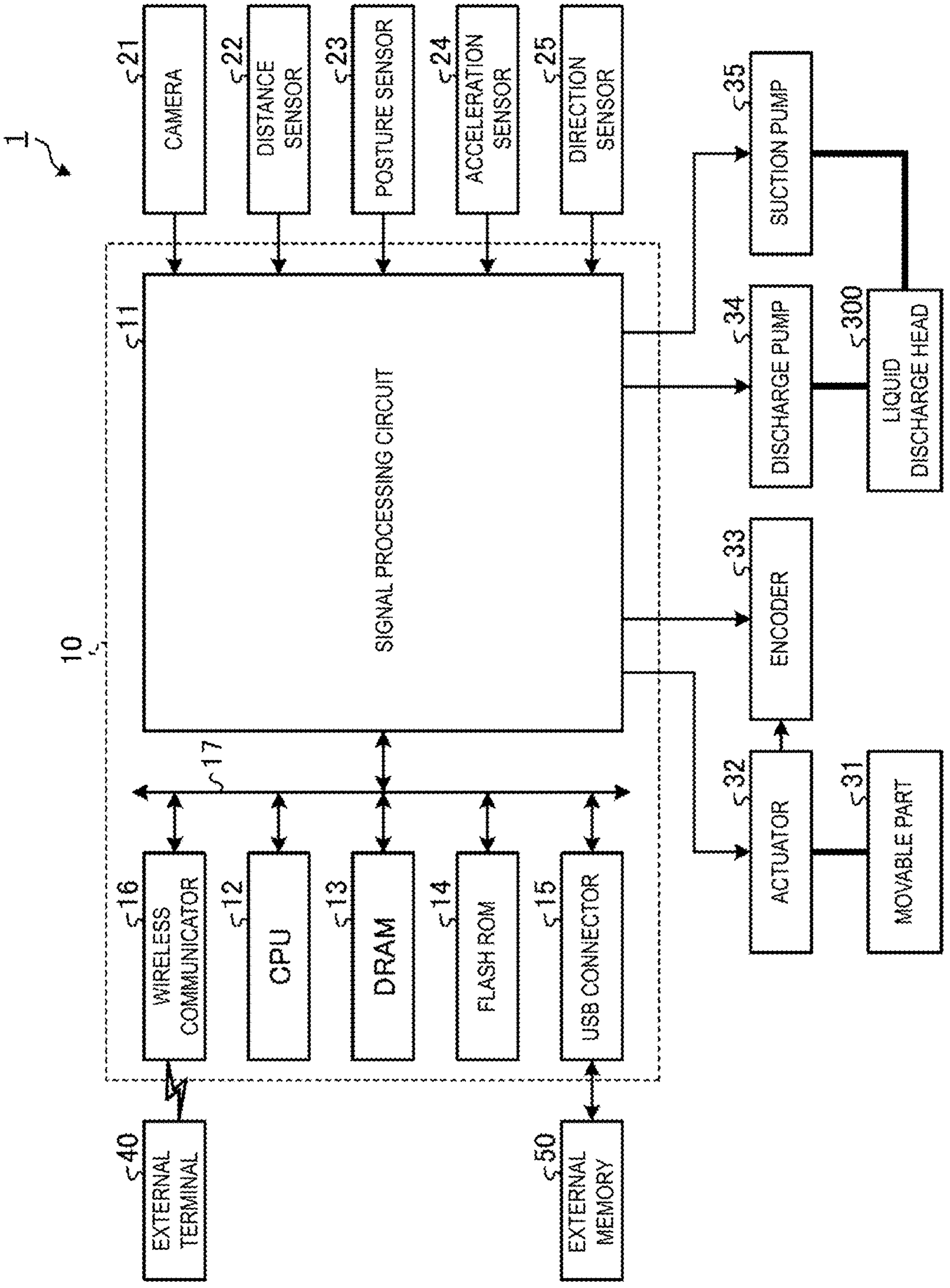
FIG. 6 is a diagram illustrating an outline hardware configuration example of a liquid discharge system according to an embodiment.

A schematic configuration of the liquid discharge system according to an embodiment will be described. FIG. 6 is a diagram illustrating a schematic hardware configuration example of a liquid discharge system according to an embodiment. FIG. 6 schematically illustrates an example of a hardware configuration of a liquid discharge system, and there is no need to be limited to the particular example illustrated in FIG. 6. In the example illustrated in FIG. 6, arrows indicate flows of data or signals, and solid lines indicate physical connection relationships.

As illustrated in FIG. 6, the liquid discharge system 1 includes various sensors. The liquid discharge system 1 specifically includes a camera 21, a distance sensor 22, a posture sensor 23, an acceleration sensor 24, and a direction sensor 25.

The camera 21 has a function of capturing an image of the object $B_1$ (working surface $SF_1\_B_1$ or working surface $SF_2\_B_1$) to be printed (recorded). The camera 21 is mounted to any position of the robotic arm 200. The liquid discharge system 1 may include a plurality of the cameras 21 installed at different positions. The camera 21 outputs the captured image to the control unit 100. The camera 21 may be a wide-angle camera. In this case, the control unit 100 extracts a feature point from the image above the liquid discharge system 1 captured by the wide-angle camera. The control unit 100 can also generate, by using the extracted feature point as a virtual viewpoint, a bird's-eye view image of a recording (printing) status of the object $B_1$ (working surface $SF_1\_B_1$ or working surface $SF_2\_B_1$). This allows the control unit 100 to determine the recording (printing) status.

The distance sensor 22 detects a distance between the object $B_1$ (working surface $SF_1\_B_1$ or working surface $SF_2\_B_1$) to be recorded (printed) and the liquid discharge head 300. The distance sensor 22 can be implemented by, for example, a time of flight (ToF) sensor or a depth sensor (also referred to as a depth camera) that acquires a depth map, a depth image, or the like. The distance sensor 22 is provided at any position of the circulation device 400 at which the distance between the object $B_1$ (working surface $SF_1\_B_1$ or working surface $SF_2\_B_1$) to be recorded (printed) and the liquid discharge head 300 can be detected. The distance sensor 22 outputs a detection result to the control unit 100. The control unit 100 can execute, in accordance with the distance detected by the distance sensor 22, an operation depending to a relative positional relationship between the object $B_1$ (working surface $SF_1\_B_1$ or working surface $SF_2\_B_1$) and the liquid discharge head 300.

The posture sensor 23 detects a posture of the liquid discharge head 300. The posture sensor 23 can be implemented by using, for example, a three-axis or nine-axis gyro sensor. The posture sensor 23 detects the posture, for example, roll, pitch, and yaw of the liquid discharge head 300. The posture sensor 23 is provided at any position of the circulation device 400. That is, in the liquid discharge system 1, the posture of the circulation device 400 is detected as the posture of the liquid discharge head 300. The posture sensor 23 outputs a detection result to the control unit 100. The control unit 100 can specify the posture of the liquid discharge head 300 in accordance with the posture detected by the posture sensor 23.

The acceleration sensor 24 detects an acceleration to be applied to the liquid discharge head 300. The acceleration sensor 24 is mounted to any position of the circulation device 400. That is, in the liquid discharge system 1, the acceleration applied to the circulation device 400 is detected as the acceleration applied to the liquid discharge head 300. The acceleration sensor 24 outputs a detection result to the control unit 100. The control unit 100 can calculate, for example, a current position of the liquid discharge head 300 with respect to a position at the start of printing in accordance with the detection result of the acceleration sensor 24 and a detection result of the direction sensor 25 described below.

The direction sensor 25 detects a direction (orientation) in which the liquid discharge head 300 faces. The direction sensor 25 can be implemented by, for example, a geomagnetic sensor. The direction sensor 25 is mounted to any position of the circulation device 400. That is, in the liquid discharge system 1, the orientation of the circulation device 400 is detected as the orientation of the liquid discharge head 300. The direction sensor 25 outputs a detection result to the control unit 100. The control unit 100 can calculate a current orientation of the liquid discharge head 300 with respect to the orientation at the start of printing in accordance with the detection result of the direction sensor 25.

The posture sensor 23, the acceleration sensor 24, and the direction sensor 25 described above may be implemented by an inertial measurement unit (IMU). The liquid discharge system 1 may include other sensors such as an ultrasonic sensor, a temperature sensor and a human detection sensor other than those illustrated in FIG. 6.

The liquid discharge system 1 includes a drive mechanism for driving the robotic arm 200. The drive mechanism includes, for example, a movable part 31 including a link (bone part) or a joint (articulation part) constituting the robotic arm 200 and an end effector, an actuator 32 for driving the movable part 31, and an encoder 33 that detects a rotation angle (position) of a motor. The drive mechanism appropriately controls the position, posture, and the like of the liquid discharge head 300 by achieving an operation in cooperation with the above-described various sensors and the like. The end effector of the movable part 31 is connected to the liquid discharge head 300 and the circulation device 400. The encoder 33 that can be used is an encoder using any detection method, such as an optical encoder or a magnetic encoder. The link constituting the robotic arm 200 may be a serial link or a parallel link.

The liquid discharge system 1 includes a discharge pump 34, a suction pump 35, and the liquid discharge head 300.

The discharge pump 34 feeds the liquid stored in a tank (not illustrated) to the liquid discharge head 300 through the first channel $RT_1$ and the supply port $P_{in}$. The discharge pump 34 generates positive pressure for delivering the liquid stored in the tank to the liquid discharge head 300. The discharge pump 34 can deliver the liquid stored in the tank to the liquid discharge head 300, for example, at a predetermined constant supply pressure.

The suction pump 35 feeds to the tank the liquid recovered in the head without being discharged from the liquid discharge head 300, through the discharge port $P_{out}$ and the second channel $RT_2$. The suction pump 35 generates negative pressure for suctioning the liquid recovered in the head and feeding the same back to the tank. The suction pump 35 can deliver the liquid suctioned from the liquid discharge head 300 to the tank, for example, at a predetermined constant recovery pressure.

The discharge pump 34 and the suction pump 35 can be implemented by a rotary pump such as a gear pump or a displacement pump such as a diaphragm pump.

The liquid discharge system 1 includes a controller 10 that collectively controls operations of the system. The controller 10 has a configuration in which a signal processing circuit 11, a central processing unit (CPU) 12, a dynamic random access memory (DRAM) 13, a flash read only memory (ROM) 14, a universal serial bus (USB) connector 15, and a wireless communicator 16 are mutually connected via an internal bus 17. Although not illustrated in FIG. 2, the liquid discharge system 1 includes various interfaces for inputting and outputting data to and from the camera 21, the actuator 42, the discharge pump 34, and the suction pump 35. The liquid discharge system 1 may include a battery or the like that supplies power to each unit included in the liquid discharge system 1.

The various sensors described above, the actuator 32, the encoder 33, the discharge pump 34, and the suction pump 35 are connected to the signal processing circuit 11. The signal processing circuit 11 sequentially takes in sensor data and pump data supplied from the various sensors described above, a control signal received from an external terminal 40, and the like, and sequentially stores these data at predetermined positions in the DRAM 13 via the internal bus 17.

The sensor data, the pump data and the like stored in the DRAM 13 are used when the CPU 12 controls an operation of the liquid discharge system 1. The data is transmitted to an external device such as a server via the wireless communicator 16, as necessary. The wireless communicator 16 has a communication function for communicating with an external device, the external terminal 40, or the like via a predetermined network such as a wireless local area network (LAN) such as Bluetooth (registered trademark) or WiFi (registered trademark) or a mobile communication network.

For example, when the liquid discharge system 1 is powered on, the CPU 12 reads out a control program stored in an external memory 50 connected to the USB connector 15, and stores the read control program in the DRAM 13. The CPU 12 reads out control data (print control data and posture control data) stored in the flash ROM 14, and stores the read control data in the DRAM 13.

The CPU 12 controls an operation of the liquid discharge system 1 in accordance with each sensor data, pump data, control data and the like sequentially stored in the DRAM 13 by the signal processing circuit 11, as described above. For example, the CPU 12 specifies a position, a posture, and the like of the liquid discharge head 300 in accordance with each sensor data and control data sequentially stored in the DRAM 13. A control command to be given to the actuator 42 is generated based on a result of specifying the position, the posture, and the like of the liquid discharge head 300. The CPU 12 outputs the generated control command to the actuator 42 via the signal processing circuit 11. The CPU 12 generates a control command to be given to the discharge pump 34 and the suction pump 35 in accordance with the control data sequentially stored in the DRAM 13. The CPU 12 outputs the generated control command to the discharge pump 34 and the suction pump 35 via the signal processing circuit 11.

In this way, the liquid discharge system 1 collectively controls the operation of the system by cooperation between hardware such as a CPU 12 and a predetermined program such as a control program.

Example of Functional Configuration of Each Unit Included in Liquid Discharge System 1

An example of a functional configuration of each unit included in the liquid discharge system 1 according to an embodiment will be described. FIG. 7 is a block diagram illustrating an example of a functional configuration of each unit provided in a liquid discharge system according to an embodiment. FIG. 7 illustrates, in functional blocks, an example of a functional configuration of each unit provided in the liquid discharge system 1 and that there is no need to be limited to the particular example illustrated in FIG. 7, provided that the various functions of the liquid discharge system 1 according to an embodiment can be achieved. In addition, FIG. 7 illustrates a function of each unit provided in the liquid discharge system 1 according to an embodiment and omits an illustration of other general components. The constitutional elements of each unit included in the liquid discharge system 1 illustrated in FIG. 7 are functional concepts and are not limited to the example illustrated in FIG. 7, and are not necessarily physically configured as illustrated. For example, the specific form of distribution and integration of each of the functional blocks is not limited to that illustrated, and all or a portion thereof can be functionally or physically distributed and integrated in any unit, depending on various loads, usage conditions, and the like. In the example illustrated in FIG. 7, a thin solid line indicates a flow of data or a signal, and a thick solid line indicates a physical connection relationship.

As illustrated in FIG. 7, the control unit 100 included in the liquid discharge system 1 includes an input/output interface (IF) 110, a storage 120, and a controller 130.

The input/output IF 110 is various interfaces for inputting and outputting various data to and from the robotic arm 200 and the circulation device 400.

The storage 120 includes, for example, a semiconductor memory element such as the DRAM 13 and the flash ROM 14 illustrated in FIG. 6, and a storage device such as a hard disk and an optical disc. The storage 120 can store, for example, programs, data, and the like for implementing various processing executed by the controller 130. The programs stored in the storage 120 include a control program for implementing a processing function corresponding to each unit of the controller 130. The programs stored in the storage 120 include an operating system (OS) and various application programs.

As illustrated in FIG. 7, the storage 120 includes a print control data storage 121 and a head control data storage 122.

The print control data storage 121 stores print control data for controlling printing (recording) of the object $B_1$. The print control data includes information about a size, a shape, and the like of the object $B_1$, print property configuration information, print start position and print end position information, and target value information about pressures of the discharge pump 34 and the suction pump 35.

The head control data storage 122 stores head control data for controlling the position and posture of the liquid discharge head 300. The head control data includes configuration information regarding the posture of the liquid discharge head 300 with respect to the object $B_1$ (working surface $SF_1\_B_1$ or working surface $SF_2\_B_1$). FIG. 8 is a chart illustrating an outline of head control data according to an embodiment.

As illustrated in FIG. 8, the head control data includes an item of "head movement posture" and an item of "head orientation", which are associated with each other. In the item of "head movement posture", a movement posture of the liquid discharge head 300 when printing (recording) is performed on the object $B_1$ (working surface $SF_1\_B_1$ or working surface $SF_2\_B_1$) is set. In the item of "head orientation", a positional relationship between the supply port $P_{in}$ and the discharge port $P_{out}$ for determining an orientation of the liquid discharge head 300 with respect to each of an outward path and a homeward path of the liquid discharge head 300 reciprocating along the printing direction is set.

In the example illustrated in FIG. 8, when the movement posture is "substantially horizontal" and the movement is performed on the "outward path", a relative positional relationship in which the supply port $P_{in}$ is "right" and the discharge port $P_{out}$ is "left" with respect to a printing direction (head movement direction) is set as information for determining the orientation of the liquid discharge head 300. On the other hand, when the movement posture is "substantially horizontal" and the movement is performed on the "homeward path", a relative positional relationship in which the supply port $P_{in}$ is "right" and the discharge port $P_{out}$ is "left" with respect to the printing direction (head movement direction) is set as the information for determining the orientation of the liquid discharge head 300. Thereby, when the movement posture of the liquid discharge head 300 is substantially horizontal, printing is always started from a positive pressure side (a side where the pressure is high) of the liquid circulating inside the liquid discharge head 300. Here, the positive pressure side is a supply side on which the liquid is supplied to the liquid discharge head 300, and may also be referred as an upstream side of the liquid circulating inside the liquid discharge head 300. The relative positional relationship among the printing direction, the supply port $P_{in}$ and the discharge port $P_{out}$ illustrated in FIG. 8 is determined according to the internal structure of the liquid discharge head 300 and the circulation direction of the liquid, and when the internal structure of the liquid discharge head 300 and the circulation direction of the liquid are different, the relative positional relationship among the printing direction, the supply port $P_{in}$ and the discharge port $P_{out}$ illustrated in FIG. 8 is naturally changed.

In the example illustrated in FIG. 8, when the movement posture is "substantially vertical" and the movement is performed on the "outward path", a relative positional relationship in which the supply port $P_{in}$ is "lower" and the discharge port $P_{out}$ is "upper" with respect to the printing direction (head movement direction) is set as the information for determining the orientation of the liquid discharge head 300. On the other hand, when the movement posture is "substantially vertical" and the movement is performed on the "homeward path", a relative positional relationship in which the supply port $P_{in}$ is "upper" and the discharge port $P_{out}$ is "lower" with respect to the printing direction (head movement direction) is set as the information for determining the orientation of the liquid discharge head 300. Thereby, even when the moving direction of the liquid discharge head 300 is substantially vertical, printing is always started from the positive pressure side (supply side) of the liquid circulating inside the liquid discharge head 300. In the example illustrated in FIG. 7, the information for determining the orientation of the head is set for each of the outward path and the homeward path, but only the orientation of the head corresponding to the outward path may be set, and the orientation may be set to be reversed by 180 degrees on the homeward path.

The controller 130 is implemented by the controller 10 (such as the signal processing circuit 11, the CPU 12, and the DRAM 13) illustrated in FIG. 5. Various processing executed by the controller 130 is implemented by, for example, executing instructions described in a control program read from an internal memory such as the DRAM 13 by a processor such as the CPU 12 by using the internal memory as a work area. Programs that are read from the internal memory by the processor such as the CPU 12 include an OS and an application program. The controller 130 may be implemented by, for example, an integrated circuit such as an ASIC (application specific integrated circuit) or a FPGA (field programmable gate array).

Specific Example of Operation Control by Controller Unit

Figure 9:
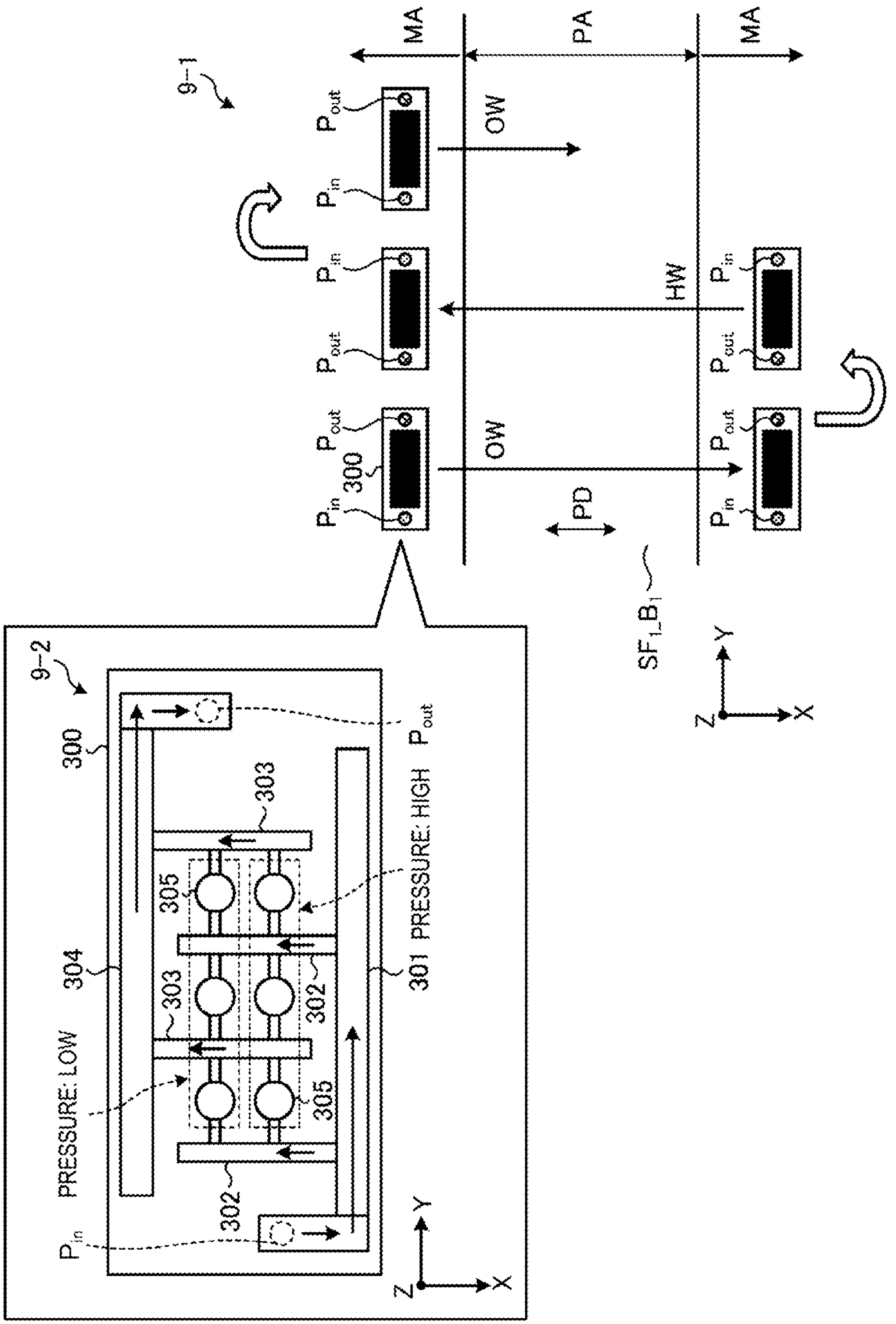
FIG. 9 is a diagram illustrating an outline (part 1) of operation control of a liquid discharge head according to an embodiment.
Figure 10:
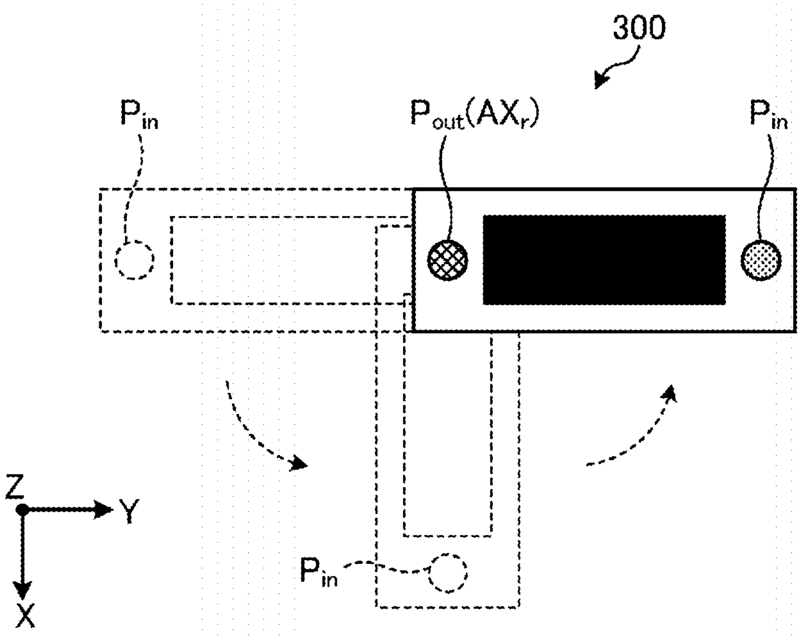
FIG. 10 is a diagram illustrating a method (part 1) of reversing a liquid discharge head according to an embodiment.
Figure 11:
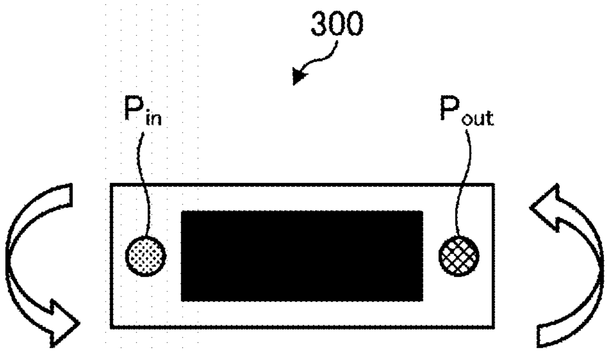
FIG. 11 is a diagram illustrating a method (part 2) of reversing a liquid discharge head according to an embodiment.

Hereinafter, a specific example of operation control by the controller 130 will be described. FIG. 9 is a diagram illustrating an outline (part 1) of operation control of the liquid discharge head according to an embodiment. FIG. 10 is a diagram illustrating a method (part 1) of reversing the liquid discharge head according to an embodiment. FIG. 11 is a diagram illustrating a method (part 2) of reversing the liquid discharge head according to an embodiment. FIG. 9 illustrates a schematic diagram 9-1 illustrating an operation of the liquid discharge head 300 during printing and an enlarged plan view 9-2 of the liquid discharge head 300. In the example illustrated in FIG. 9, the liquid discharge head 300 appears to perform printing at intervals, but this is for clearly illustrating an operation of the liquid discharge head 300. That is, depending on the printing method, the position and posture of the liquid discharge head 300 may be controlled so that printing is performed on a printing area without any gap, or the position and posture of the liquid discharge head 300 may be controlled so that printing is performed on the printing area while causing printing portions to overlap partially.

The controller 130 controls, via the robotic arm 200, the liquid discharge head 300 to discharge the liquid while reciprocating along the printing direction PD. The controller 130 controls the operation of the robotic arm 200 and the position and posture of the liquid discharge head 300 so that printing is started from the positive pressure side of the liquid circulating inside the liquid discharge head 300. That is, the controller 130 adjusts the orientation of the liquid discharge head 300 so that printing on the object $B_1$ (working surface $SF_1\_B_1$ or working surface $SF_2\_B_1$) is always started from a side on which the elements 305 on the supply reservoir 301 side having a high pressure are arranged.

Specifically, as illustrated in the schematic diagram 9-1 of FIG. 9, the controller 130 refers to the head control data, and controls the orientation of the liquid discharge head 300 so that the supply port $P_{in}$ is "right" and the discharge port $P_{out}$ is "left" with respect to the printing direction (namely, +X direction) from the start of printing to the completion of printing on the outward path OW when the movement posture of the liquid discharge head 300 is substantially horizontal (substantially horizontal with respect to the XY plane). As illustrated in the enlarged plan view 9-2 of FIG. 9, when controlling the orientation of the liquid discharge head 300, the controller 130 adjusts the arrangement direction of the elements 305 to be parallel to the direction (Y-axis direction) orthogonal to the printing direction PD.

When the printing (printing of one line) on the outward path OW is completed, the controller 130 refers to the head control data, and reverses the orientation of the liquid discharge head 300 so that the supply port $P_{in}$ is "right" and the discharge port $P_{out}$ is "left" with respect to the printing direction (namely, −X direction) from the start of printing to the completion of printing on the homeward path HW that is a next line to be printed. The controller 130 reverses the orientation of the liquid discharge head 300 by moving the liquid discharge head by 180 degrees in an arc-like manner around a predetermined rotation axis so that a gap does not occur on a line to be printed between the outward path OW and the homeward path HW. For example, as illustrated in FIG. 10, the controller 130 can move the liquid discharge head 300 counterclockwise in an arc-like manner by 180 degrees with the discharge port $P_{out}$ as the rotation axis $AX_r$. At this time, the orientation of the liquid discharge head 300 is reversed so that a gap does not occur on the line to be printed between the outward path OW and the homeward path HW. As illustrated in FIG. 11, the controller 180 may reverse the orientation of the liquid discharge head 300 by reversing the liquid discharge head by 180 degrees on the spot without changing the position of the liquid discharge head 300. In this case, the controller 130 reverses the orientation of the liquid discharge head 300 and then moves the liquid discharge head 300 to a print start position of a next line to be printed. The controller 130 reverses, after the printing on the outward path OW is completed, the orientation of the liquid discharge head 300 on a maintenance area MA where the liquid discharge head 300 is retracted until the printing on the homeward path is started.

Similar to the outward path OW, the controller 130 adjusts, when controlling the orientation of the liquid discharge head 300, the arrangement direction of the elements 305 to be parallel to the direction (Y-axis direction) orthogonal to the printing direction PD. The controller 130 refers to, when printing (printing of one line) on the homeward path HW is completed, the head control data, and reverses the orientation of the liquid discharge head 300 so that the supply port $P_{in}$ is "right" and the discharge port $P_{out}$ is "left" with respect to the printing direction (namely, +X direction) from the start of printing to the completion of printing on the outward path OW that is a next line to be printed. In this case, the controller 130 can reverse the orientation of the liquid discharge head 300 by moving the liquid discharge head 300 clockwise in an arc-like manner by 180 degrees with the supply port $P_{in}$ as the rotation axis $AX_r$. The controller 130 may reverse the orientation of the liquid discharge head 300 by reversing the liquid discharge head by 180 degrees on the spot without changing the position of the liquid discharge head 300.

In the example illustrated in FIG. 9, the controller 130 repeatedly reverses the orientation of the liquid discharge head 300 each time printing of one line (on the outward path or homeward path) is completed until printing of all lines is completed on the working surface $SF_1\_B_1$ of the object $B_1$. In this way, the controller 130 controls the orientation of the liquid discharge head 300 such that printing is always started from the positive pressure side (side where the pressure is high) of the liquid circulating inside the liquid discharge head 300 when the liquid discharge head 300 performs printing while reciprocating in a substantially horizontal movement posture with respect to the working surface $SF_1\_B_1$ of the object $B_1$. Thereby, the controller 130 can suppress an occurrence of discharge omission during printing in the substantially horizontal movement posture and maintain a quality of the image to be recorded.

Figure 12:
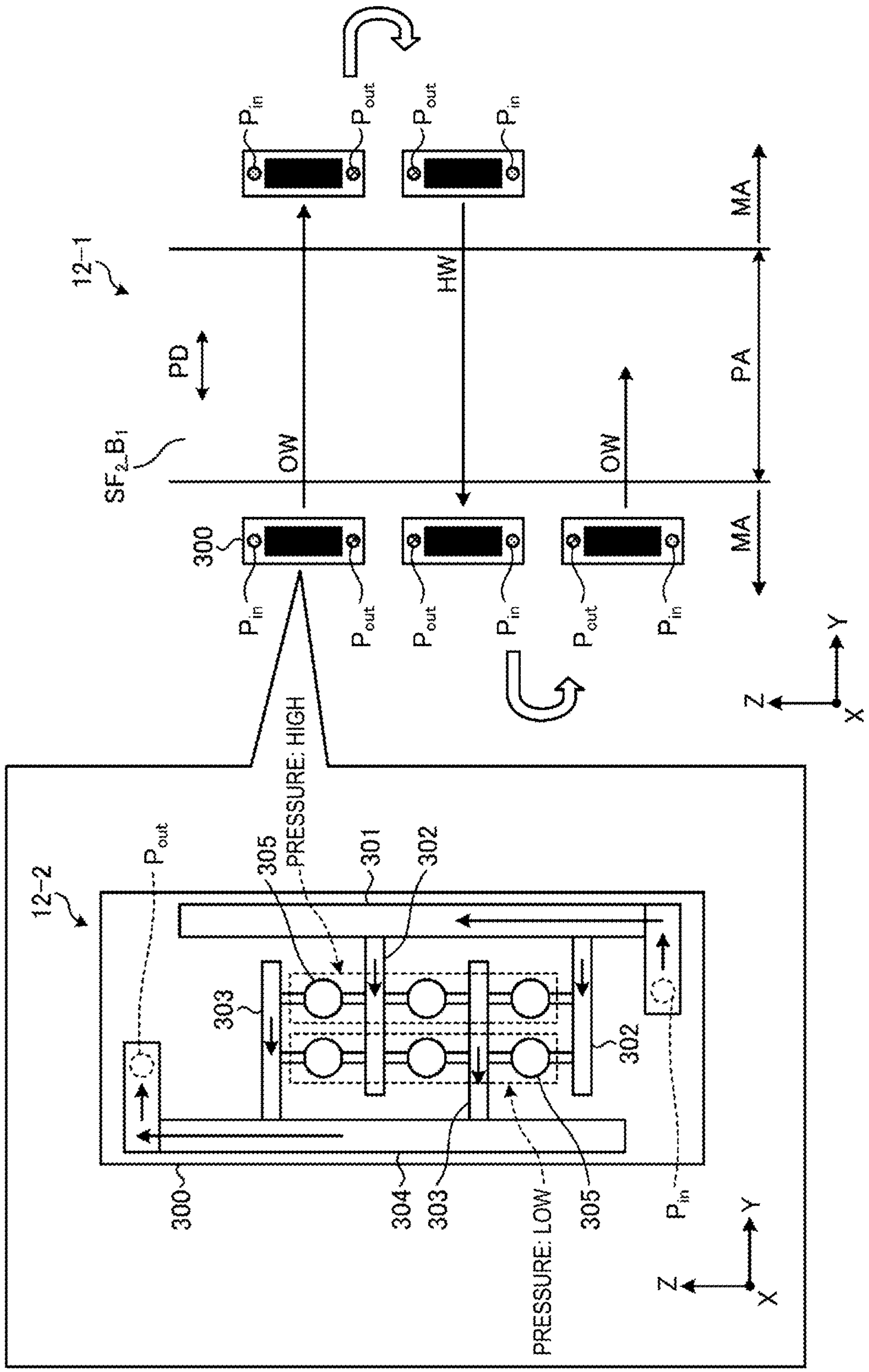
FIG. 12 is a diagram illustrating an outline (part 2) of operation control of a liquid discharge head according to an embodiment.

FIG. 12 is a diagram illustrating an outline (part 2) of the operation control of the liquid discharge head according to an embodiment. FIG. 12 illustrates a schematic diagram 12-1 illustrating an operation of the liquid discharge head 300 during printing and an enlarged plan view 12-2 of the liquid discharge head 300. As illustrated in FIG. 12, when the movement posture of the liquid discharge head 300 is substantially vertical (substantially horizontal with respect to the YZ plane), the controller 130 controls the position and posture of the liquid discharge head 300 so that printing is started from the positive pressure side of the liquid circulating inside the liquid discharge head 300, as in the example illustrated in FIG. 9.

That is, the controller 130 refers to the head control data, and controls the orientation of the liquid discharge head 300 so that the supply port $P_{in}$ is "upper" and the discharge port $P_{out}$ is "lower" with respect to the direction (Z-axis direction) orthogonal to the printing direction PD from the start of printing to the completion of printing on the outward path OW by the liquid discharge head 300 when the movement posture of the liquid discharge head 300 is substantially vertical (substantially horizontal with respect to the YZ plane). The controller 130 adjusts, when controlling the orientation of the liquid discharge head 300, the arrangement direction of the elements 305 to be parallel to the direction (Z-axis direction) orthogonal to the printing direction PD.

When the printing (printing of one line) on the outward path OW is completed, the controller 130 refers to the head control data, and reverses the orientation of the liquid discharge head 300 so that the supply port $P_{in}$ is "lower" and the discharge port $P_{out}$ is "upper" with respect to the direction (Z-axis direction) orthogonal to the printing direction PD from the start of printing to the completion of printing on the return homeward path HW. The reversing method is the same as in the example illustrated in FIGS. 10 and 11. The controller 130 reverses, after the printing on the outward path OW is completed, the orientation of the liquid discharge head 300 on the maintenance area MA where the liquid discharge head 300 is retracted until the printing on the homeward path is started.

Similar to the outward path OW, the controller 130 adjusts, when controlling the orientation of the liquid discharge head 300, the arrangement direction of the elements 305 to be parallel to the direction (X-axis direction) orthogonal to the printing direction PD.

Also in the case illustrated in FIG. 12, the controller 130 repeatedly reverses the orientation of the liquid discharge head 300 each time printing of one line (on the outward path or homeward path) is completed until printing of all lines is completed on the working surface $SF_2\_B_1$ of the object $B_1$. In this way, the controller 130 controls the orientation of the liquid discharge head 300 so that printing is always started from the positive pressure side (side where the pressure is high) of the liquid circulating inside the liquid discharge head 300 when the liquid discharge head 300 performs printing while reciprocating in a substantially horizontal movement posture with respect to the working surface $SF_2\_B_1$ of the object $B_1$. Thereby, the controller 130 can suppress the occurrence of discharge omission during printing in the substantially vertical movement posture and maintain the quality of an image to be recorded.

Referring back to FIG. 7, the circulation device 400 included in the liquid discharge system 1 includes a sensor 410. The sensor 410 can be implemented by the distance sensor 22, the posture sensor 23, the acceleration sensor 24, and the direction sensor 25 illustrated in FIG. 6. The sensor 410 outputs a detection result to the control unit 100. The detection result by the sensor 410 includes a distance between the object $B_1$ (working surface $SF_1\_B_1$ or working surface $SF_2\_B_1$) to be recorded (printed) and the liquid discharge head 300, a posture of the liquid discharge head 300, an acceleration applied to the liquid discharge head 300, and a direction (orientation) in which the liquid discharge head 300 faces.

The circulation device 400 includes the discharge pump 34 and the suction pump 35 illustrated in FIG. 3. The circulation device 400 supplies liquid to the liquid discharge head 300 while controlling a circulation pressure of the liquid circulating between the circulation device and the liquid discharge head 300.

Example of Processing Procedure by Control Unit

Figure 13:
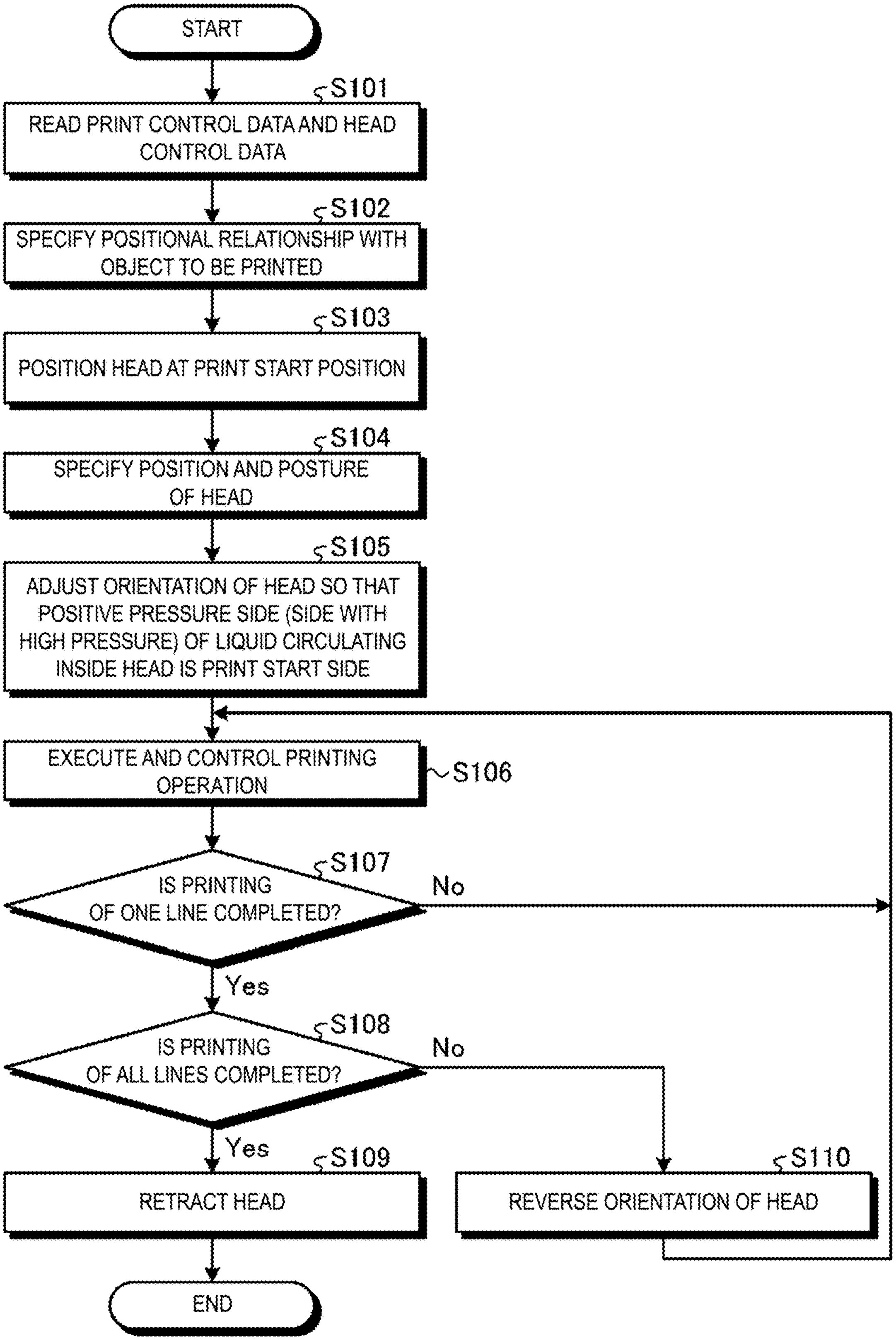
FIG. 13 is a flowchart illustrating an example of a processing procedure executed by a control unit according to an embodiment.

Hereinafter, an example of a processing procedure executed by the control unit 100 in the liquid discharge system 1 will be described with FIG. 13. FIG. 13 is a flowchart illustrating an example of a processing procedure executed by the control unit according to an embodiment. The processing procedure illustrated in FIG. 13 is achieved by the controller 130 included in the control unit 100.

As illustrated in FIG. 13, the controller 130 reads the print control data and head control data from the storage 120 (step S101).

The controller 130 specifies a positional relationship with the object $B_1$ that is an object to be printed in accordance with the detection result (distance information) of the sensor 410 acquired from the circulation device 400 (step S102).

The controller 130 positions the liquid discharge head 300 at a predetermined print start position in accordance with the print control data and the positional relationship specified in step S102 (step S103).

The controller 130 specifies the position and posture of the liquid discharge head 300 in accordance with the detection result (posture and direction) of the sensor 410 acquired from the circulation device 400 (step S104).

The controller 130 adjusts the orientation of the liquid discharge head 300 so that the positive pressure side (side where the pressure is high) of the liquid circulating inside the head becomes the print start side (step S105).

After adjusting the orientation of the liquid discharge head 300, the controller 130 executes and controls a printing operation (step S106).

The controller 130 determines whether printing of one line is completed (step S107).

When determining that the printing of one line (on the outward path or homeward path) is not completed (step S107; No), the controller 130 returns to the processing procedure of step S106 described above and continues the control of the printing operation.

On the other hand, when determining that the printing of one line (on the outward path or homeward path) is completed (step S107; Yes), the controller 130 determines whether printing of all lines is completed (step S108).

When determining that the printing of all lines is completed (step S108; Yes), the controller 130 causes the liquid discharge head 300 to retract to a predetermined retraction position (step S109), and ends the processing procedure illustrated in FIG. 13.

On the other hand, when determining that the printing of all lines is not completed (step S108; No), the controller 130 reverses the orientation of the liquid discharge head 300 (step S110), returns to the processing procedure of step S106 described above, and executes and controls the printing operation.

Variations (Regarding Refresh Processing)

Figure 14:
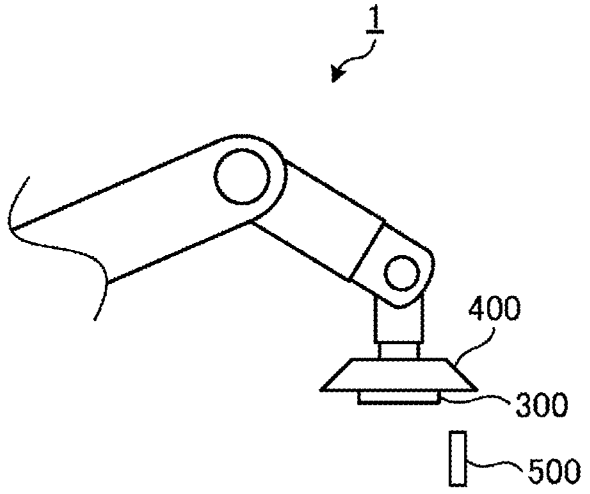
FIG. 14 is a schematic diagram illustrating an outline configuration of a liquid discharge system according to a variation.

In the embodiment described above, refresh processing of cleaning a discharge surface (a surface having a discharge hole 305*h*) of the liquid discharge head 300 may be executed each time printing of one line is completed. FIG. 14 is a schematic diagram illustrating a schematic configuration of a liquid discharge system according to a variation.

As illustrated in FIG. 14, the liquid discharge system 1 includes a wiper blade 500. When reversing the orientation of the liquid discharge head 300, the control unit 100 controls the wiper blade 500 to wipe the liquid discharge surface.

The liquid discharge system 1 may execute the refresh processing by a method other than wiping. For example, the control unit 100 may perform spitting (flushing) when reversing the orientation of the liquid discharge head 300. Alternatively, the orientation of the liquid discharge head 300 may be reversed while the control unit 100 causes the liquid discharge head 300 to be subjected to meniscus vibration. Each refresh processing described above may be executed in the maintenance area MA described above.

Figure 15:
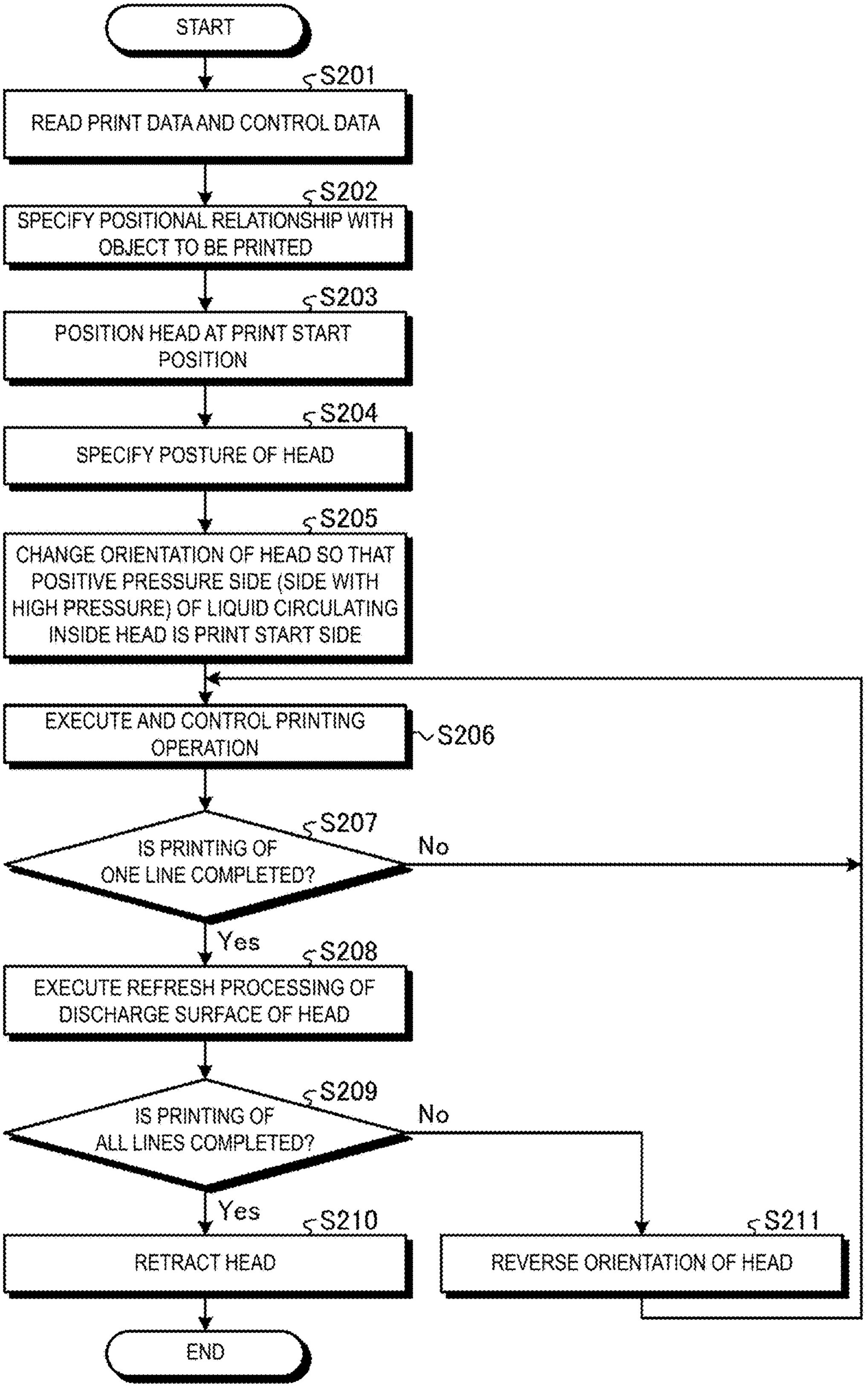
FIG. 15 is a flowchart illustrating an example of a processing procedure executed by a control unit according to a variation.

Hereinafter, an example of a processing procedure executed by the control unit 100 according to the variation will be described. FIG. 15 is a flowchart illustrating an example of a processing procedure executed by the control unit according to the variation. The processing procedure illustrated in FIG. 15 is achieved by the controller 130 included in the control unit 100. The processing procedure executed by the control unit 100 according to the variation is different from the processing procedure (refer to FIG. 13) executed by the control unit 100 according to the embodiment described above, in that a processing procedure of step S208 illustrated in FIG. 15 is included. Hereinafter, differences from the embodiment described above will be described.

As illustrated in FIG. 15, when determining that printing of one line (on the outward path or homeward path) is completed (step S207; Yes), the controller 130 executes refresh processing of the discharge surface of the liquid discharge head 300 (step S208).

After the refresh processing, the controller 130 determines whether printing of all lines is completed (step S209), and executes subsequent processing.

When the controller 130 causes the liquid discharge head 300 to be subjected to meniscus vibration as the refresh processing, the controller may execute the refresh processing after the processing procedure of step S209.

(Regarding Posture During Printing)

Figure 16:
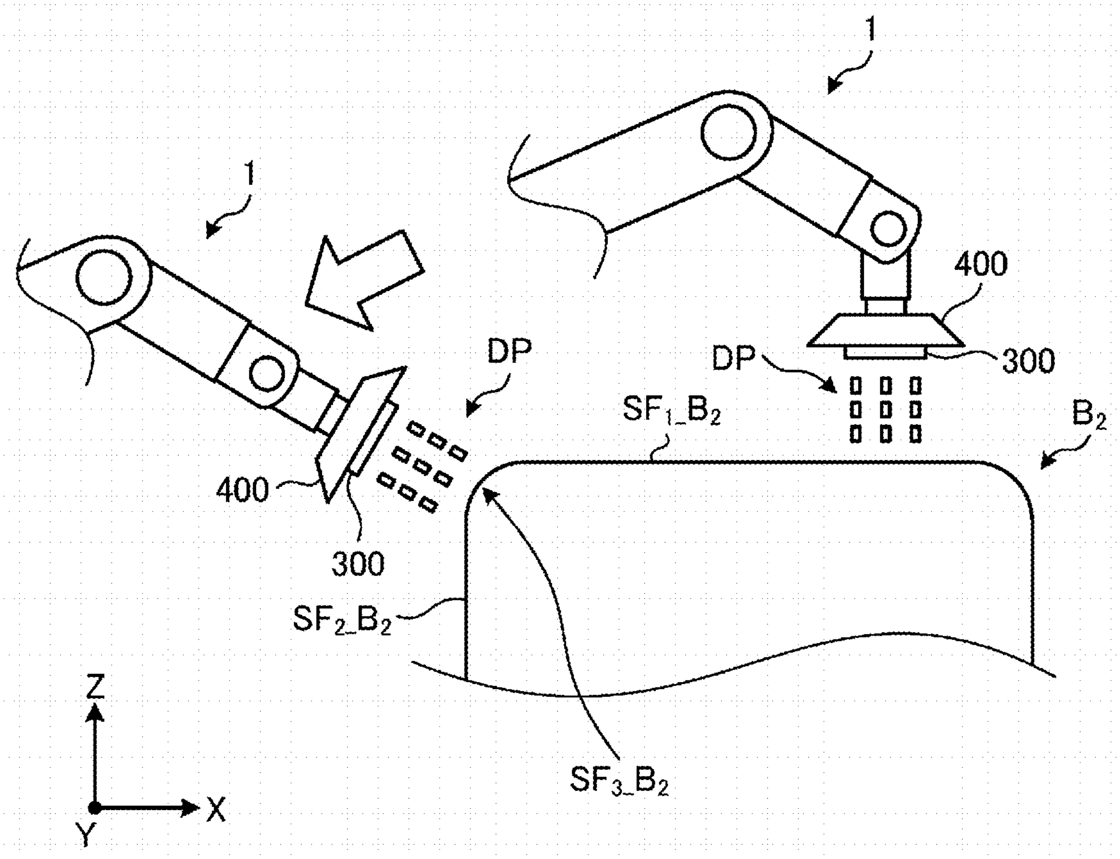
FIG. 16 is a view illustrating an outline of a liquid discharge system according to a variation.

The liquid discharge system 1 disclosed by the present application can perform printing while maintaining various postures according to the object to be printed, in addition to performing printing while maintaining a substantially horizontal posture with respect to, for example, the substantially horizontal working surface $SF_1\_B_1$ and performing printing while maintaining a substantially horizontal posture with respect to, for example, the substantially horizontal working surface $SF_2\_B_1$ as in the embodiment described above. FIG. 16 is a view illustrating an outline of a liquid discharge system according to the variation.

As illustrated in FIG. 16, in the liquid discharge system 1 according to the variation, the controller 130 of the control unit 100 can discharge the liquid DP and perform printing not only on the substantially horizontal working surface $SF_1\_B_2$ and the substantially vertical working surface $SF_2\_B_2$ of the object B2 as the object to be printed but also on a working surface $SF_3\_B_2$ as a curved surface while flexibly changing the position and posture of the liquid discharge head 300. Also in this case, the controller 130 controls the position and posture of the liquid discharge head 300 so that printing is started from the positive pressure side (side where the pressure is high) of the liquid circulating inside the liquid discharge head 300.

In the embodiment and the variation described above, the example in which the liquid discharge system 1 includes the robotic arm and the control unit 100 controls the position and posture of the liquid discharge head 300 mounted to the most distal end portion of the robotic arm 200 through the robotic arm 200 has been described. The control of the liquid discharge system 1 according to the embodiment and the variation described above can be applied to inkjet printers and inkjet plotters that each utilize an inkjet recording method as well as various devices that each discharge liquid (or liquid droplet) by using an inkjet method. In this case, various devices such as an inkjet printer utilizing the inkjet recording method may include a mechanism for reversing the orientation of the liquid discharge head 30 each time printing of one line is completed. The example in which the orientation of the liquid discharge head 30 is reversed each time printing of one line is completed has been described, but the present invention is not necessarily limited thereto. For example, the control unit 100 may reverse the circulation direction of the liquid flowing through the liquid discharge head 30 each time printing of one line is completed. Specifically, after the printing on the outward path OW is completed, the control unit 100 may control the circulation pressure to change the positive pressure to the negative pressure. Thereby, printing is started from the positive pressure side (side where the pressure is high) of the liquid circulating inside the liquid discharge head 300.

Embodiments have been described in order to fully and clearly disclose the technology according to the appended claims. However, the appended claims are not to be limited to the embodiments described above, and should be configured to embody all variations and alternative configurations that a person skilled in the art may make within the fundamental matter set forth in the present description.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A recording device, comprising:
- a liquid discharger rotatable around a predetermined rotation axis and including (i) a supply port through which liquid is supplied into the liquid discharger and (ii) a discharge port from which the liquid is discharged to be configured to discharge liquid while circulating the liquid from the supply port to the discharge port; and
- a controller configured to
  - control the liquid discharger to discharge the liquid while reciprocating along a printing direction, and
  - control a position and a posture of the liquid discharger,
- wherein printing is started from an upstream side in flow of the liquid circulating inside the liquid discharger from the supply port to the discharge port.

2. The recording device according to claim 1, wherein the controller is configured to control the liquid discharger to maintain a substantially horizontal posture with respect to a working surface of an object to be printed.

3. The recording device according to claim 2, wherein the controller is configured to reverse an orientation of the liquid discharger each time movement on an outward path or a homeward path of a reciprocation is completed.

4. The recording device according to claim 3, wherein the controller is configured to reverse the orientation of the liquid discharger by moving the liquid discharger in an arc-like manner.

5. The recording device according to claim 3, wherein the controller is configured to reverse the orientation of the liquid discharger by rotating the liquid discharger.

6. The recording device according to claim 3, wherein the controller is configured to refresh a discharge surface of the liquid when reversing the orientation of the liquid discharger.

7. The recording device according to claim 6, further comprising
- a wiping mechanism configured to wipe the discharge surface,
- wherein the controller is configured to wipe the discharge surface of the liquid when reversing the orientation of the liquid discharger.

8. The recording device according to claim 6, wherein the controller is configured to perform spitting when reversing the orientation of the liquid discharger.

9. The recording device according to claim 6, wherein the controller is configured to reverse the orientation of the liquid discharger while causing the liquid discharger to be subjected to meniscus vibration.

10. The recording device according to claim 1, wherein the liquid discharger further includes:
- a plurality of elements including discharge holes that discharge the liquid;
- a supply manifold that delivers the liquid to the plurality of elements;
- a supply reservoir that delivers the liquid to the supply manifold;
- a recovery manifold to which the liquid from the plurality of elements is delivered;
- a recovery reservoir to which the liquid from the recovery manifold is delivered, and the controller is further configured to:
- adjust a direction of the liquid discharger such that printing with respect to an object is always started from a side on which the elements on the supply reservoir side are arranged.

11. The recording device according to claim 1, wherein the controller is configured to:
- control the posture of the liquid discharger based on a movement direction of the liquid discharger reciprocating along a recording direction.

12. A recording device, comprising:
- a liquid discharger including (i) a supply port through which liquid is supplied into the liquid discharger and (ii) a discharge port from which the liquid is discharged to be configured to discharge liquid while circulating the liquid from the supply port to the discharge port;
- a robotic arm configured to reciprocate the liquid discharger along a printing direction; and
- a controller configured to control, via the robotic arm, the liquid discharger to discharge the liquid while reciprocating along the printing direction,
- wherein the controller is configured to control the liquid discharger or the robotic arm, so that printing is started from an upstream side in flow of the liquid circulating inside the liquid discharger from the supply port to the discharge port.

* * * * *